United States Patent [19]

Fukasawa

[11] Patent Number: 5,217,678
[45] Date of Patent: Jun. 8, 1993

[54] GANG CONTROL-ROD CONTROLLING SYSTEM AND REACTOR OPERATION METHOD

[75] Inventor: Yukihisa Fukasawa, Hitachi, Japan

[73] Assignee: Hitachi, Ltd., Tokyo, Japan

[21] Appl. No.: 916,697

[22] Filed: Jul. 22, 1992

[30] Foreign Application Priority Data

Jul. 22, 1991 [JP] Japan .................................. 3-181091

[51] Int. Cl.⁵ .............................................. G21C 7/06
[52] U.S. Cl. ..................................... 376/237; 376/239
[58] Field of Search ........................ 376/236, 237, 239

[56] References Cited

U.S. PATENT DOCUMENTS

| | | | |
|---|---|---|---|
| 3,654,607 | 4/1972 | Waure et al. | 376/237 |
| 4,368,171 | 1/1983 | Maruyama et al. | 376/217 |
| 4,717,528 | 1/1988 | Meyer et al. | 376/237 |
| 5,089,212 | 2/1992 | Strobel et al. | 376/237 |

Primary Examiner—Donald P. Walsh
Assistant Examiner—Frederick H. Voss
Attorney, Agent, or Firm—Antonelli, Terry Stout & Kraus

[57] ABSTRACT

A storage 14 of a unit 13 constituting a gang control-rod operating unit stores an A type pattern sequence for configuring an A type control rod pattern, a B type pattern sequence for configuring a B type control rod pattern, and a control rod pattern exchange sequence. The control rod pattern exchange sequence comprises groups subsequent to 5 in the A type sequence and groups subsequent to 5 in the B type sequence. A control panel includes a sequence select switch 12a, a control rod group select switch 12b, and an insert/withdraw select switch 12c. In exchanging the control rod pattern, an operator actuates the sequence select switch 12a to select the control rod pattern exchange sequence, and then actuates the control rod group select switch 12b and the insert/withdraw select switch 12c to operate a plurality of control rods at the same time for carrying out the pattern exchange. The operation of exchanging the control rod pattern is facilitated and reliability is improved. Selection of the control rod pattern exchange sequence is allowed only when reactor power is above a set value at which an RWM 17 is to be released.

12 Claims, 13 Drawing Sheets

ARRAY OF A TYPE PATTERN

ARRAY OF B TYPE PATTERN

FIG. 5(a)

A TYPE SEQUENCE

|    | 02 | 06 | 10 | 14 | 18 | 22 | 26 | 30 | 34 | 38 | 42 | 46 | 50 | 54 | 58 |
|----|----|----|----|----|----|----|----|----|----|----|----|----|----|----|----|
| 59 |    |    |    |    | 4  |    | 3  |    | 4  |    |    |    |    |    |    |
| 55 |    |    |    | 2  |    | 1  |    | 2  |    | 1  |    |    |    |    |    |
| 51 |    |    | 4  |    | 3  |    | 4  |    | 3  |    | 4  |    |    |    |    |
| 47 |    | 2  |    | 1  |    | 2  |    | 1  |    | 2  |    | 1  |    |    |    |
| 43 |    | 4  |    | 3  |    | 4  |    | 3  |    | 4  |    | 3  |    | 4  |    |
| 39 | 2  |    | 1  |    | 2  |    | 1  |    | 2  |    | 1  |    | 2  |    | 1  |
| 35 |    | 3  |    | 4  |    | 3  |    | 4  |    | 3  |    | 4  |    | 3  |    |
| 31 | 1  |    | 2  |    | 1  |    | 2  |    | 1  |    | 2  |    | 1  |    | 2  |
| 27 |    | 4  |    | 3  |    | 4  |    | 3  |    | 4  |    | 3  |    | 4  |    |
| 23 | 2  |    | 1  |    | 2  |    | 1  |    | 2  |    | 1  |    | 2  |    | 1  |
| 19 |    | 3  |    | 4  |    | 3  |    | 4  |    | 3  |    | 4  |    | 3  |    |
| 15 |    | 2  |    | 1  |    | 2  |    | 1  |    | 2  |    | 1  |    |    |    |
| 11 |    |    | 3  |    | 4  |    | 3  |    | 4  |    | 3  |    |    |    |    |
| 07 |    |    |    | 2  |    | 1  |    | 2  |    | 1  |    |    |    |    |    |
| 03 |    |    |    |    | 3  |    | 4  |    | 3  |    |    |    |    |    |    |

FIG. 5(b)

A TYPE SEQUENCE

|    | 02 | 06 | 10 | 14 | 18 | 22 | 26 | 30 | 34 | 38 | 42 | 46 | 50 | 54 | 58 |
|----|----|----|----|----|----|----|----|----|----|----|----|----|----|----|----|
| 59 |    |    |    |    | 5  |    | 6  |    | 6  |    | 5  |    |    |    |    |
| 55 |    |    |    | 7  |    | 16 |    | 15 |    | 16 |    | 7  |    |    |    |
| 51 |    |    | 6  |    | 10 |    | 8  |    | 9  |    | 10 |    | 6  |    |    |
| 47 |    | 7  |    | 17 |    | 18 |    | 19 |    | 18 |    | 17 |    | 7  |    |
| 43 | 5  |    | 10 |    | 14 |    | 11 |    | 12 |    | 14 |    | 10 |    | 5  |
| 39 |    | 16 |    | 18 |    | 21 |    | 20 |    | 21 |    | 18 |    | 16 |    |
| 35 | 6  |    | 9  |    | 12 |    | 13 |    | 13 |    | 11 |    | 8  |    | 6  |
| 31 |    | 15 |    | 19 |    | 20 |    | 22 |    | 20 |    | 19 |    | 15 |    |
| 27 | 6  |    | 8  |    | 11 |    | 13 |    | 13 |    | 12 |    | 9  |    | 6  |
| 23 |    | 16 |    | 18 |    | 21 |    | 20 |    | 21 |    | 18 |    | 16 |    |
| 19 | 5  |    | 10 |    | 14 |    | 12 |    | 11 |    | 14 |    | 10 |    | 5  |
| 15 |    | 7  |    | 17 |    | 18 |    | 19 |    | 18 |    | 17 |    | 7  |    |
| 11 |    |    | 6  |    | 10 |    | 9  |    | 8  |    | 10 |    | 6  |    |    |
| 07 |    |    |    | 7  |    | 16 |    | 15 |    | 16 |    | 7  |    |    |    |
| 03 |    |    |    |    | 5  |    | 6  |    | 6  |    | 5  |    |    |    |    |

FIG. 6(a)

B TYPE SEQUENCE

|    | 02 | 06 | 10 | 14 | 18 | 22 | 26 | 30 | 34 | 38 | 42 | 46 | 50 | 54 | 58 |
|----|----|----|----|----|----|----|----|----|----|----|----|----|----|----|----|
| 59 |    |    |    | 4  |    | 3  |    | 4  |    | 3  |    |    |    |    |    |
| 55 |    |    | 2  |    | 1  |    | 2  |    | 1  |    | 2  |    |    |    |    |
| 51 |    |    | 4  |    | 3  |    | 4  |    | 3  |    | 4  |    | 3  |    |    |
| 47 |    | 2  |    | 1  |    | 2  |    | 1  |    | 2  |    | 1  |    | 2  |    |
| 43 | 4  |    | 3  |    | 4  |    | 3  |    | 4  |    | 3  |    | 4  |    | 3  |
| 39 |    | 1  |    | 2  |    | 1  |    | 2  |    | 1  |    | 2  |    | 1  |    |
| 35 | 3  |    | 4  |    | 3  |    | 4  |    | 3  |    | 4  |    | 3  |    | 4  |
| 31 |    | 2  |    | 1  |    | 2  |    | 1  |    | 2  |    | 1  |    | 2  |    |
| 27 | 4  |    | 3  |    | 4  |    | 3  |    | 4  |    | 3  |    | 4  |    | 3  |
| 23 |    | 1  |    | 2  |    | 1  |    | 2  |    | 1  |    | 2  |    | 1  |    |
| 19 | 3  |    | 4  |    | 3  |    | 4  |    | 3  |    | 4  |    | 3  |    | 4  |
| 15 |    | 2  |    | 1  |    | 2  |    | 1  |    | 2  |    | 1  |    | 2  |    |
| 11 |    |    | 3  |    | 4  |    | 3  |    | 4  |    | 3  |    | 4  |    |    |
| 07 |    |    | 2  |    | 1  |    | 2  |    | 1  |    | 2  |    |    |    |    |
| 03 |    |    |    | 3  |    | 4  |    | 3  |    | 4  |    |    |    |    |    |

FIG. 6(b)

B TYPE SEQUENCE

|    | 02 | 06 | 10 | 14 | 18 | 22 | 26 | 30 | 34 | 38 | 42 | 46 | 50 | 54 | 58 |
|----|----|----|----|----|----|----|----|----|----|----|----|----|----|----|----|
| 59 |    |    |    | 5  |    | 6  |    | 5  |    |    |    |    |    |    |    |
| 55 |    |    | 6  |    | 9  |    | 9  |    | 6  |    |    |    |    |    |    |
| 51 |    |    | 7  |    | 20 |    | 19 |    | 20 |    | 8  |    |    |    |    |
| 47 |    | 8  |    | 12 |    | 10 |    | 11 |    | 13 |    | 7  |    |    |    |
| 43 |    | 6  |    | 13 |    | 21 |    | 18 |    | 22 |    | 12 |    | 6  |    |
| 39 | 5  |    | 20 |    | 22 |    | 15 |    | 14 |    | 21 |    | 20 |    | 5  |
| 35 |    | 9  |    | 11 |    | 14 |    | 16 |    | 15 |    | 10 |    | 9  |    |
| 31 | 6  |    | 19 |    | 18 |    | 17 |    | 17 |    | 18 |    | 19 |    | 6  |
| 27 |    | 9  |    | 10 |    | 15 |    | 16 |    | 14 |    | 11 |    | 9  |    |
| 23 | 5  |    | 20 |    | 21 |    | 14 |    | 15 |    | 22 |    | 20 |    | 5  |
| 19 |    | 6  |    | 12 |    | 22 |    | 18 |    | 21 |    | 13 |    | 6  |    |
| 15 |    | 7  |    | 13 |    | 11 |    | 10 |    | 12 |    | 8  |    |    |    |
| 11 |    |    | 8  |    | 20 |    | 19 |    | 20 |    | 7  |    |    |    |    |
| 07 |    |    | 6  |    | 9  |    | 9  |    | 6  |    |    |    |    |    |    |
| 03 |    |    |    | 5  |    | 6  |    | 5  |    |    |    |    |    |    |    |

FIG. 7(a)

CONTROL ROD PATTERN EXCHANGE SEQUENCE

|    | 02 | 06 | 10 | 14 | 18 | 22 | 26 | 30 | 34 | 38 | 42 | 46 | 50 | 54 | 58 |
|----|----|----|----|----|----|----|----|----|----|----|----|----|----|----|----|
| 59 |    |    |    |  1 |    |  2 |    |  2 |    |  1 |    |    |    |    |    |
| 55 |    |    |  3 |    | 12 |    | 11 |    | 12 |    |  3 |    |    |    |    |
| 51 |    |  2 |    |  6 |    |  4 |    |  5 |    |  6 |    |  2 |    |    |    |
| 47 |    |  3 |    | 13 |    | 14 |    | 15 |    | 14 |    | 13 |    |  3 |    |
| 43 |  1 |    |  6 |    | 10 |    |  7 |    |  8 |    | 10 |    |  6 |    |  1 |
| 39 |    | 12 |    | 14 |    | 17 |    | 16 |    | 17 |    | 14 |    | 12 |    |
| 35 |  2 |    |  5 |    |  8 |    |  9 |    |  9 |    |  8 |    |  5 |    |  2 |
| 31 |    | 11 |    | 15 |    | 16 |    | 18 |    | 16 |    | 15 |    | 11 |    |
| 27 |  2 |    |  4 |    |  7 |    |  9 |    |  9 |    |  7 |    |  4 |    |  2 |
| 23 |    | 12 |    | 14 |    | 17 |    | 16 |    | 17 |    | 14 |    | 12 |    |
| 19 |  1 |    |  6 |    | 10 |    |  8 |    |  7 |    | 10 |    |  6 |    |  1 |
| 15 |    |  3 |    | 13 |    | 14 |    | 15 |    | 14 |    | 13 |    |  3 |    |
| 11 |    |  2 |    |  6 |    |  5 |    |  4 |    |  6 |    |  2 |    |    |    |
| 07 |    |    |  3 |    | 12 |    | 11 |    | 12 |    |  3 |    |    |    |    |
| 03 |    |    |    |  1 |    |  2 |    |  2 |    |  1 |    |    |    |    |    |

FIG. 7(b)

CONTROL ROD PATTERN EXCHANGE SEQUENCE

|    | 02 | 06 | 10 | 14 | 18 | 22 | 26 | 30 | 34 | 38 | 42 | 46 | 50 | 54 | 58 |
|----|----|----|----|----|----|----|----|----|----|----|----|----|----|----|----|
| 59 |    |    |    | 19 |    | 20 |    | 19 |    |    |    |    |    |    |    |
| 55 |    |    | 20 |    | 23 |    | 23 |    | 20 |    |    |    |    |    |    |
| 51 |    | 21 |    | 34 |    | 33 |    | 34 |    | 22 |    |    |    |    |    |
| 47 |    | 22 |    | 26 |    | 24 |    | 25 |    | 27 |    | 21 |    |    |    |
| 43 | 20 |    | 27 |    | 35 |    | 32 |    | 36 |    | 26 |    | 20 |    |    |
| 39 | 19 |    | 34 |    | 36 |    | 29 |    | 28 |    | 35 |    | 34 |    | 19 |
| 35 |    | 23 |    | 25 |    | 28 |    | 30 |    | 29 |    | 25 |    | 23 |    |
| 31 | 20 |    | 33 |    | 32 |    | 31 |    | 31 |    | 32 |    | 33 |    | 20 |
| 27 |    | 23 |    | 24 |    | 29 |    | 30 |    | 28 |    | 24 |    | 23 |    |
| 23 | 19 |    | 34 |    | 35 |    | 28 |    | 29 |    | 36 |    | 34 |    | 19 |
| 19 |    | 20 |    | 26 |    | 36 |    | 32 |    | 35 |    | 27 |    | 20 |    |
| 15 |    | 21 |    | 27 |    | 25 |    | 24 |    | 26 |    | 22 |    |    |    |
| 11 |    |    | 22 |    | 34 |    | 33 |    | 34 |    | 21 |    |    |    |    |
| 07 |    |    | 20 |    | 23 |    | 23 |    | 20 |    |    |    |    |    |    |
| 03 |    |    |    | 19 |    | 20 |    | 19 |    |    |    |    |    |    |    |

FIG. 8

| CONTROL ROD GROUP | CONTROL ROD COORDINATE VALUES |
|---|---|
| 1 | (26,55) (42,55) (18,47) (34,47)<br>(50,47) (10,39) (26,39) (42,39)<br>(58,39) (02,31) (18,31) (34,31)<br>(50,31) (10,23) (26,23) (42,23)<br>(58,23) (18,15) (34,15) (50,15)<br>(26,07) (42,07) |
| ⋮ | ⋮ |
| 5 | (18,59) (42,59) (02,43) (58,43)<br>(02,19) (58,19) (18,03) (42,03) |
| ⋮ | ⋮ |
| 20 | (30,39) (22,31) (38,31) (30,23) |
| 21 | (22,39) (38,39) (22,23) (38,23) |
| 22 | (30,31) |

FIG.9

| CONTROL ROD GROUP | CONTROL ROD COORDINATE VALUES |
|---|---|
| 1 | (22,55) (38,55) (14,47) (30,47)<br>(46,47) (06,39) (22,39) (38,39)<br>(54,39) (14,31) (30,31) (46,31)<br>(06,23) (22,23) (38,23) (54,23)<br>(14,15) (30,15) (46,15) (22,07)<br>(38,07) |
| ⋮ | ⋮ |
| 5 | (22,59) (38,59) (02,39) (58,39)<br>(02,23) (58,23) (22,03) (38,03) |
| ⋮ | ⋮ |
| 21 | (22,43) (42,39) (18,23) (38,19) |
| 22 | (18,39) (38,43) (22,19) (42,23) |

FIG. 10

| CONTROL ROD GROUP | CONTROL ROD COORDINATE VALUES |
|---|---|
| 1 | (18, 59) (42, 59) (02, 43) (58, 43)<br>(02, 19) (58, 19) (18, 03) (42, 03) |
| ⋮ | ⋮ |
| 17 | (22, 39) (38, 39) (22, 23) (38, 23) |
| 18 | (30, 31) |
| ⋮ | ⋮ |
| 19 | (22, 59) (38, 59) (02, 39) (58, 39)<br>(02, 23) (58, 23) (22, 03) (38, 03) |
| ⋮ | ⋮ |
| 35 | (22, 43) (42, 39) (18, 23) (38, 19) |
| 36 | (18, 39) (38, 43) (22, 19) (42, 23) |

FIG.11(a)

CONTROL ROD PATTERN EXCHANGE SEQUENCE

|    | 02 | 06 | 10 | 14 | 18 | 22 | 26 | 30 | 34 | 38 | 42 | 46 | 50 | 54 | 58 |
|----|----|----|----|----|----|----|----|----|----|----|----|----|----|----|----|
| 59 |    |    |    | 1  |    | 2  |    | 2  |    | 1  |    |    |    |    |    |
| 55 |    |    | 3  |    | 12 |    | 11 |    | 12 |    | 3  |    |    |    |    |
| 51 |    |    | 2  |    | 6  |    | 4  |    | 5  |    | 6  |    | 2  |    |    |
| 47 |    | 3  |    | 13 |    | 14 |    | 15 |    | 14 |    | 13 |    | 3  |    |
| 43 | 1  |    | 6  |    | 10 |    | 7  |    | 8  |    | 10 |    | 6  |    | 1  |
| 39 |    | 12 |    | 14 |    | 17 |    | 16 |    | 17 |    | 14 |    | 12 |    |
| 35 | 2  |    | 5  |    | 8  |    | 9  |    | 9  |    | 8  |    | 5  |    | 2  |
| 31 |    | 11 |    | 15 |    | 16 |    | 18 |    | 16 |    | 15 |    | 11 |    |
| 27 | 2  |    | 4  |    | 7  |    | 9  |    | 9  |    | 7  |    | 4  |    | 2  |
| 23 |    | 12 |    | 14 |    | 17 |    | 16 |    | 17 |    | 14 |    | 12 |    |
| 19 | 1  |    | 6  |    | 10 |    | 8  |    | 7  |    | 10 |    | 6  |    | 1  |
| 15 |    | 3  |    | 13 |    | 14 |    | 15 |    | 14 |    | 13 |    | 3  |    |
| 11 |    |    | 2  |    | 6  |    | 5  |    | 4  |    | 6  |    | 2  |    |    |
| 07 |    |    | 3  |    | 12 |    | 11 |    | 12 |    | 3  |    |    |    |    |
| 03 |    |    |    | 1  |    | 2  |    | 2  |    | 1  |    |    |    |    |    |

FIG.11(b)

CONTROL ROD PATTERN EXCHANGE SEQUENCE

|    | 02 | 06 | 10 | 14 | 18 | 22 | 26 | 30 | 34 | 38 | 42 | 46 | 50 | 54 | 58 |
|----|----|----|----|----|----|----|----|----|----|----|----|----|----|----|----|
| 59 |    |    |    | 19 |    | 20 |    | 19 |    |    |    |    |    |    |    |
| 55 |    |    | 20 |    | 23 |    | 23 |    | 20 |    |    |    |    |    |    |
| 51 |    |    | 21 |    | 34 |    | 33 |    | 34 |    | 22 |    |    |    |    |
| 47 |    |    | 22 |    | 26 |    | 24 |    | 25 |    | 27 |    | 21 |    |    |
| 43 |    | 20 |    | 27 |    | 35 |    | 32 |    | 36 |    | 26 |    | 20 |    |
| 39 | 19 |    | 34 |    | 36 |    | 29 |    | 28 |    | 35 |    | 34 |    | 19 |
| 35 |    | 23 |    | 25 |    | 28 |    | 30 |    | 29 |    | 25 |    | 23 |    |
| 31 | 20 |    | 33 |    | 32 |    | 31 |    | 31 |    | 32 |    | 33 |    | 20 |
| 27 |    | 23 |    | 24 |    | 29 |    | 30 |    | 28 |    | 24 |    | 23 |    |
| 23 | 19 |    | 34 |    | 35 |    | 28 |    | 29 |    | 36 |    | 34 |    | 19 |
| 19 |    | 20 |    | 26 |    | 36 |    | 32 |    | 35 |    | 27 |    | 20 |    |
| 15 |    |    | 21 |    | 27 |    | 25 |    | 24 |    | 26 |    | 22 |    |    |
| 11 |    |    | 22 |    | 34 |    | 33 |    | 34 |    | 21 |    |    |    |    |
| 07 |    |    | 20 |    | 23 |    | 23 |    | 20 |    |    |    |    |    |    |
| 03 |    |    |    | 19 |    | 20 |    | 19 |    |    |    |    |    |    |    |

GANG CONTROL-ROD CONTROLLING SYSTEM AND REACTOR OPERATION METHOD

BACKGROUND OF THE INVENTION

The present invention relates to a gang control-rod controlling system for simultaneously operating a plurality of control rods, and more particularly to a gang control-rod controlling system and a reactor operation method, which are effective in exchange of a control rod pattern in boiling water reactors.

In boiling water reactors, several hundreds of fuel assemblies are accommodated in the reactor and one control rod for controlling reactor power is installed for every four fuel assemblies. In existing boiling water reactors, control rods are operated one by one. More specifically, first, by actuating a control rod select switch, the radial position of a control rod to be operated is selected. Then, by depressing an "insert" or "withdraw" button, the control is inserted or withdrawn to a predetermined axial position.

At the start-up of a reactor, reactor power is increased by withdrawing control rods. At this time, it is required to surely restrict a procedure of operating the control rods within a certain allowable limit so that reactivity worth of each control rod will not be too large. The reason of holding the reactivity worth of each control rod low is as follows. Should there occurs such an accident that any control rod is continuously withdrawn by mistake or that any control rod is dislodged to slip off from the reactor, the amount of radioactive material discharged due to damage of fuel assemblies could be kept within an allowable range from the standpoint of safety evaluation if the reactivity worth applied upon such an event is held low. A rod worth minimizer system (hereinafter referred to as an RWM system or simply as RWM) is known as means for preventing control rods from being withdrawn departing from a predetermined control rod pattern.

More specifically, such an RWM system functions to monitor respective positions of control rods and, should an operator attempts to select or withdraw the control rod deviating from a predetermined sequence of control rod operations, to issue an alarm or prevent the attempted operation. However, when reactor power is continuously raised in conformity with the RWM rules, monitoring by the RWM is no longer necessary over a certain power level because the reactivity worth of any control rods becomes small regardless of which control rod is selected. That power level at which the RWM is to be released is usually set to 10 % -35 % of the rated power. In other words, the operation of withdrawing control rods in the range below the power level at which the RWM is to be released must follow the predetermined sequence of control rod operations. Note that JP, A, 49-89094 is known as a prior patent relating to the RWM.

The procedure of withdrawing control rods that can hold the reactivity worth of each control rod small is basically to select the control rods to be withdrawn in such order that they are evenly distributed in the radial direction of a core, and also not to successively withdraw those control rods which are adjacent to each other. If two control rods adjacent to each other are withdrawn in succession, the power density at that position would be so extremely increased that the reactivity worth of those control rods becomes too large.

Two A type and B type sequences are known as the procedure of withdrawing control rods that can follow the RWM rules. The A type sequence is utilized to configure an A type control rod pattern and the B type sequence is utilized to configure a B type control rod pattern. The term "A type control rod pattern" is here used to mean a pattern of only those control rods arranged in the form of a checker board including a control rod at the core center. The term "B type control rod pattern" is here used to mean a pattern of only those control rods arranged in the form of a checker board in which a control rods at the core center is not included.

The A type sequence is set such that the control rods (the B-group control rods) of about half the number of total control rods arranged in the form of a checker board in which a center control rod is not included are divided into four groups, i.e., groups 1 to 4, in such a manner that the control rods of the respective groups are evened in number and arrangement in order to follow the RWM rules so that the reactivity worth of any withdrawn control rod may be held below a certain reference value, and the remaining about half control rods (the A-group control rods) are divided into 18 groups, i.e., groups 5 to 22, each comprising one, four, eight or twelve control rods, in consideration of symmetry. Also, the B type sequence is set such that the control rods (the A-group control rods) of about half the number of total control rods arranged in the form of a checker board including a center control rod are divided into four groups, i.e., groups 1 to 4, in such a manner that the control rods of the respective groups are evened in number and arrangement in order to follow the RWM rules so that the reactivity worth of any withdrawn control rod may be held below a certain reference value, and the remaining about half control rods (the A-group control rods) are divided into 18 groups, i.e., groups 5 to 22, each comprising two, four, eight or twelve control rods, in consideration of symmetry.

In the case of configuring the A type control rod pattern by using the A type sequence, to follow the RWM rules, the control rods of the groups 1 to 4 are first operated one by one to be fully withdrawn. As a result, about half the control rods in the entire core are withdrawn in the form of a checker board. This means that whichever control rod is selected at the time of subsequently withdrawing any control rod in the groups 5 to 22, all the control rods adjacent thereto have already been withdrawn and, therefore, the reactivity worth of each control rod is held small. In the above process, the control rods of the same group are always operated to position at the same axial level. Specifically, when some one control rod is withdrawn to a certain axial position, any control rod belonging to other groups shall not be withdrawn until all the remaining control rods of the same group are withdrawn to the same axial position. Also, the B type control rod pattern is configured in a like manner by using the B type sequence.

In practical use, only one of the A type sequence and the B type sequence is usually stored in a storage of a central processing unit. Thus, the A type sequence is stored in the storage when the A type control rod pattern is to be configured, and the B type sequence is stored in the storage instead of the A type sequence when the B type control rod pattern is to be configured.

While in existing boiling water reactors control rods are withdrawn one by one in conformity with the RWM rules as stated above, gang operation of withdrawing several control rods has been proposed in recent years. Adopting such gang operation for control rods enables cut-down of a time required for the control rod operations and hence a start-up time. During the gang operation, it is also required to follow the RWM rules in the stage of low power. Accordingly, gang control-rod groups in each of which control rods are operated at the same time must be defined in such a manner as able to follow the RWM rules.

When the gang operation is adopted to simultaneously withdraw several control rods, it is assumed that those control rods which are simultaneously withdrawn belong to the same control group. In the case of configuring the A type control rod pattern, the aforesaid A type sequence is utilized to select the control rod group to follow the RWM rules as with the existing scheme to operate control rods one by one. In the A type sequence, the number of control rods for each of the groups 1 to 4 is about ⅛ of the total number of control rods in the core. By setting the number of ganged control rods in the groups 1 to 4 so large, the start-up time can be cut down. Specifically, the ganged control rods of the groups 1 to 4 are first fully withdrawn group by group. After that, the ganged control rods of the groups 5 to 22 are withdrawn group by group in view of power distribution across the core since the reactor power is increased. As a result, the A type pattern is configured as a final objective pattern. Also, in the case of configuring the B type control rod pattern, the aforesaid B type sequence is utilized in a like manner.

Meanwhile, reactors usually keep on operating for approximately one year, but the control rod pattern is required to be exchanged several times during the continued operation. Let it now be supposed that the control rod pattern is exchanged from the A type to the B type. In this control rod pattern exchange, the control rods used in the B type pattern is first inserted to lower the power level, and the control rods used in the A type pattern is then withdrawn to raise the power level. On this occasion, the steps of inserting and withdrawing the control rods are not carried out at a time, but repeated several times so that the reactor power will not be extremely decreased. In other words, that step of operating the control rods is performed above the power level at which the RWM is to be released.

In the existing scheme, since the control rods are operated one by one above the power level at which the RWM is to be released, the aforesaid control rod pattern exchange is carried out by first indicating the radial control rod position to select the control rod to be operated, and then actuating an "insert" or "withdraw" button. However, the following problem arises when the gang operation of control rods is adopted.

When inserting the B type pattern control rods, the B type sequence must be selected as a sequence of control rod operations rather than the A type sequence. The reason is that if the A type sequence is selected, even those control rods which must be kept fully withdrawn would be inserted through the gang operation whichever one of the control rod groups 1 to 4 is selected. To the contrary, when withdrawing the A type pattern control rods, the A type sequence must be selected for the same reason. Thus, it is required during exchange of the control rod pattern to repeat several times the steps of inserting the A type pattern control rods and withdrawing the B type pattern control rods, which necessitates one of the B type sequence and the A type sequence to be selected for each of the steps.

In the above process, the A type sequence is practically selected by storing the A type sequence in the storage of the central processing unit, and the B type sequence is also selected by storing the B type sequence in the storage. This means that each time the other sequence is selected, the sequence currently stored in the storage requires to be changed, resulting in the very complicated operation.

On the other hand, control rods are quite important as means for controlling reactivity of reactors and required to have high reliability in operation. This necessitates that in the gang control-rod operation to operate a plurality of control rods at the same time, only those control rods which are designated as belonging to the same group are surely operated at the same time. Whenever the stored sequence is changed, therefore, it is indispensable to confirm whether the newly stored sequence is correct, or whether any error has occurred. Alternate selection of the A type sequence and the B type sequence entails confirmation of the newly stored sequence whenever it is stored, which makes the operation more complicated and deteriorates the reliability.

SUMMARY OF THE INVENTION

An object of the present invention is to provide a gang control-rod controlling system and a reactor operation method, which can facilitate the operation of exchanging a control rod pattern and ensure high reliability in the gang control-rod operation to operate a plurality of control rods at the same time.

To achieve the above object, in accordance with the present invention, there is provided a gang control-rod controlling system for operating a plurality of control rods at the same time to attain a predetermined control rod pattern, wherein said system comprises (a) first means storing a first sequence of control rod operations for operating a plurality of control rods at the same time to configure a first control rod pattern, a second sequence of control rod operations for operating a plurality of control rods at the same time to configure a second control rod pattern, and a third sequence of control rod operations for operating a plurality of control rods at the same time to exchange a control rod pattern between said first control rod pattern and said second control rod pattern; and (b) second means for selecting one of said first to third sequences of control rod operations stored in said first means, and operating a plurality of control rods at the same time based on the selected sequence of control rod operations.

In the gang control-rod controlling system of the present invention thus arranged, the first sequence of control rod operations and the second sequence of control rod operations are utilized to follow the rules of an RWM system when reactor power is low at the start-up of a reactor. In exchanging the control rod pattern, the third sequence of control rod operations is added in view of the fact that the reactor power is above a set level at which the rules of the RWM system are to be released. By selecting the third sequence of control rod operations, further selection of the sequence is no longer required during the exchange of the control rod pattern. Since those sequences are stored in advance, selection of the third sequence of control rod operations only requires an operator to actuate a switch and select it. As a result, the operation of exchanging the control rod pattern is facilitated and high reliability is ensured in the gang control-rod operation.

In the above gang control-rod controlling system, preferably, said second means includes means for inhibiting selection of said third sequence of control rod operations when the reactor power is below the set value. With the provision of such means, should the operation of selecting the third sequence of control rod operations is made when the reactor power is below the set level at which the RWM rules are to be released, that selection would not be allowed, making it possible to avoid such a risk that adjacent control rods may be withdrawn in succession below the release power level of the RWM rules, and thus to ensure a high degree of safety.

Also preferably, said second means includes rod worth limiting means that functions when the reactor power is below the set value whereby withdrawal of control rods is inhibited when reactivity worth of those control rods exceeds a predetermined range. In this case, more preferably, said second means further includes means actuatable by an operator for selecting the group number of plural control rods to be operated at the same time, and when said reactor power is below the set value, said rod worth limiting means determines whether or not said control rod group number selected by the operator is in match with said selected sequence of control rod operations and, if the decision is no, inhibits output of said selected sequence of control rod operations.

By so arranging the second means, when the reactor power is below the set value of the rod worth limiting means in an attempt of selecting the first sequence of control rod operations or the second sequence of control rod operations to start up the reactor, the rod worth limiting means functions in such a manner that even if the operator should select the incorrect control rod group number by mistake, withdrawal of the control rods of that group is inhibited and the reactivity worth of any withdrawn control rod is held within a predetermined range.

Preferably, said second means includes first operating means actuatable by the operator for selecting one of said first to third sequences of control rod operations, second operating means actuatable by the operator for selecting the group number of plural control rods to be operated at the same time, third operating means actuatable by the operator for selecting insertion or withdrawal of plural control rods to be operated at the same time, sequence select means for selecting one of said first to third sequences of control rod operations stored in said first means that corresponds to the sequence of control rod operations selected by said first operating means, gang control-rod select means for selecting position data associated with control rods of the group number selected by said second operating means, from the sequence of control rod operations selected by said sequence select means, and control rod operation select means for determining, based on the selection by said third operating means, insertion or withdrawal of the plural control rods associated with the position data selected by said gang control-rod select means. In this case, more preferably, said second means further includes means for, when said reactor power is below the set value, determining whether or not the control rod group number selected by said second operating means is in match with the sequence of control rod operations selected by said sequence select means and, if the decision is no, disabling said selected sequence of control rod operations.

In the above gang control-rod controlling system, more preferably, said first sequence of control rod operations includes first sequence data to configure a first type control rod pattern in which control rods inserted at the rated power comprise only those control rods arranged in the form of a checker board including a control rod at the core center, said second sequence of control rod operations includes second sequence data to configure a second type control rod pattern in which control rods inserted at the rated power comprise only those control rods arranged in the form of a checker board in which a control rod at the core center is not included, and said third sequence of control rod operations includes third sequence data in combination of a part of said first sequence data and a part of said second sequence data. In this case, still more preferably, each of said first to third sequences of control rod operations includes data comprising the group numbers of plural control rods to be operated at the same time in correspondence to coordinate values indicative of respective radial positions of the control rods belonging to each group number.

Further, said first sequence of control rod operations may contain sequence data in which all control rods are divided into first to m-th groups in order of withdrawing the control rods, the first to fourth groups including those control rods of about half the number of total control rods that are arranged in the form of a checker board and in which a control rod at the core center is not included, and the fifth to m-th groups including the remaining about half control rods; said second sequence of control rod operations may contain sequence data in which all control rods are divided into first to n-th groups in order of withdrawing the control rods, the first to fourth groups including those control rods of about half the number of total control rods that are arranged in the form of a checker board including the control rod at the core center, and the fifth to n-th groups including the remaining about half control rods; and said third sequence of control rod operations may contain sequence data in combination of the fifth to m-th groups in said first sequence of control rod operations and the fifth to n-th groups in said second sequence of control rod operations.

To achieve the above object, in accordance with the present invention, there is also provided a reactor operation method for operating a plurality of control rods at the same time to attain a predetermined control rod pattern, wherein said method comprises (a) a first step of previously storing a first sequence of control rod operations for operating a plurality of control rods at the same time to configure a first control rod pattern, a second sequence of control rod operations for operating a plurality of control rods at the same time to configure a second control rod pattern, and a third sequence of control rod operations for operating a plurality of control rods at the same time to exchange a control rod pattern between said first control rod pattern and said second control rod pattern; and (b) a second step of selecting one of said first to third sequences of control rod operations stored in said first step, and operating a plurality of control rods at the same time based on the selected sequence of control rod operations.

In the above reactor operation method, preferably, said second step selects one of said second and third sequences of control rod operations when reactor power is below a set value, and selects one of said first, second and third sequences of control rod operations when the reactor power is above the set value.

Further preferably, said second step selects the group number of plural control rods to be operated at the same time in response to actuation by an operator, outputs said selected sequence of control rod operations only when said control rod group number selected by the operator is in match with said selected sequence of control rod operations when said reactor power is below the set value, and always outputs said selected sequence of control rod operations when said reactor power is above the set value.

BRIEF DESCRIPTION OF THE DRAWINGS

FIGS. 5(a) and 5(b) are diagrams showing an example of an A type sequence.

FIGS. 6(a) and 6(b) are diagrams showing an example of a B type sequence.

FIGS. 7(a) and 7(b) are diagrams showing an example of a control rod pattern exchange sequence.

FIG. 8 is a table showing details of data for the A type sequence shown in FIG. 5.

FIG. 9 is a table showing details of data for the B type sequence shown in FIG. 6.

FIG. 10 is a table showing details of data for the control rod pattern exchange sequence shown in FIG. 7.

FIGS. 11(a) and 11(b) are diagrams showing an example of the control rod pattern exchange sequence shown in FIG. 7 corresponding to FIGS. 4(a) and 4(b).

DETAILED DESCRIPTION OF THE PREFERRED EMBODIMENTS

One embodiment of the present invention will be described with reference to FIGS. 1 to 10.

Figure 1:
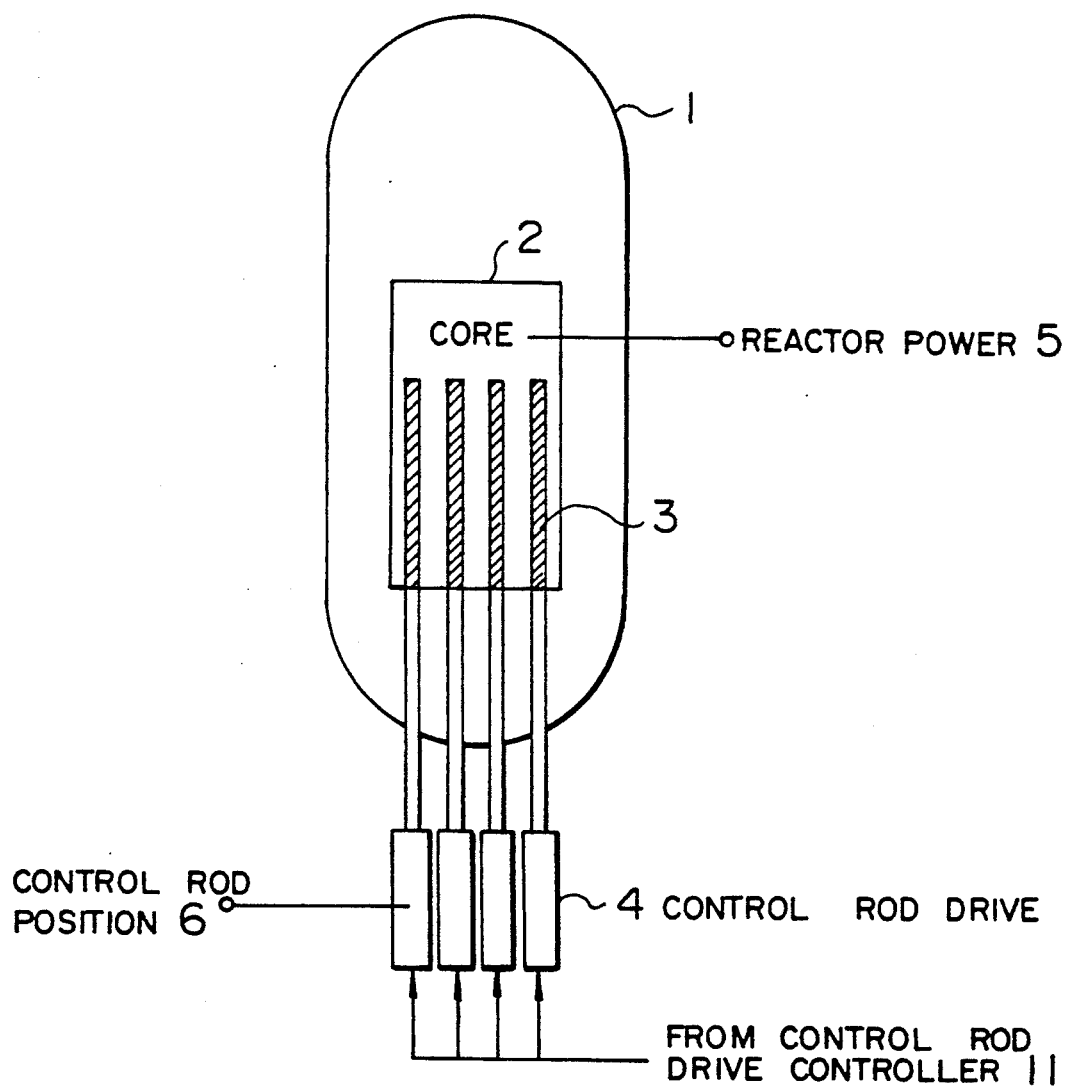
FIG. 1 is a schematic view of a reactor in which a gang control-rod controlling system according to one embodiment of the present invention is incorporated.

First, the general construction of a control rod controlling system of this embodiment will be explained by referring to FIGS. 1 and 2. In FIG. 1, reference numeral 1 denotes a pressure vessel of a boiling water reactor in which several hundreds fuel assemblies are accommodated to constitute a core 2. Control rods 3 for controlling reactor power are provided in the core 2 at a ratio of one control rod to four fuel assemblies, and are inserted or withdrawn into or from the core 2 by a control rod drive 4. Also, a power detector 5 for detecting the reactor power is installed in the core 2, and position sensors 6 in number corresponding to the number of control rods for detecting respective axial positions of the control rods 3 are installed in the control rod drive 4.

Figure 2:
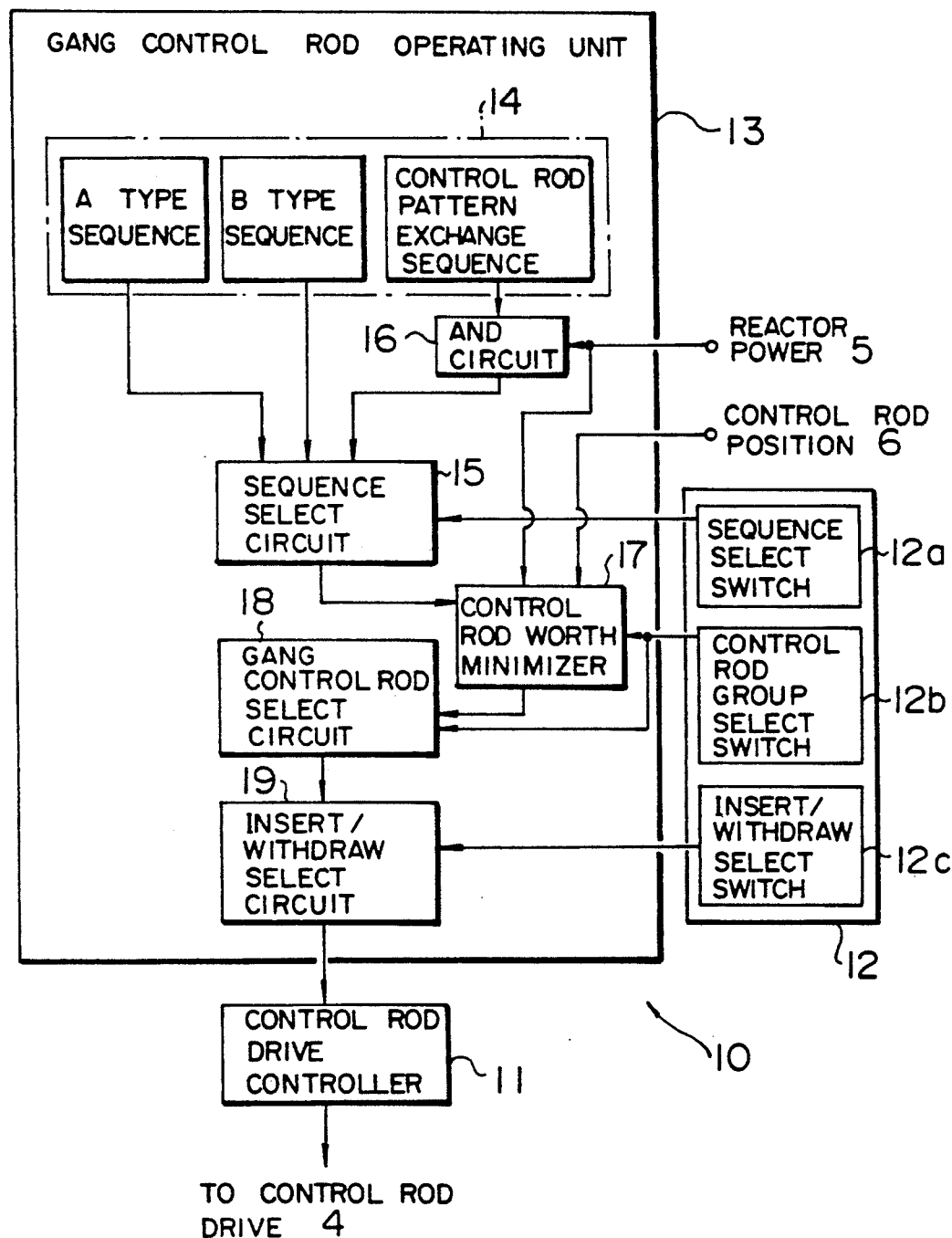
FIG. 2 is a block diagram of the gang control-rod controlling system incorporated in the reactor of FIG. 1.

In FIG. 2, the control rod controlling system of this embodiment comprises a gang control-rod operating unit 10 for selecting a plurality of control rods to be operated in a ganged manner and determining whether the control rods are to be inserted or withdrawn, and a control rod drive controller 11 for driving the control rod drive 4. The gang control-rod operating unit 10 comprises a central processing unit 13 for executing predetermined processes and arithmetic operations, the central processing nit 13 being operate by a command signal from a control panel 12.

The central processing unit 13 has a storage 14 in which there are stored, as operation sequences of ganged control rods which are to be operated at the same time, three kinds of sequence data such as an A type sequence for configuring an A type control rod pattern, a B type sequence for configuring a B type control rod pattern, and a control rod pattern exchange sequence for exchanging an control rod pattern between the A type control rod pattern and the B type control rod pattern.

The central processing unit 13 also includes a sequence select circuit 15 for selecting any one of the aforesaid three stored sequences, an AND circuit 16 for inhibiting the selection of the control rod pattern exchange sequence when the reactor power is below a set value, a rod worth minimizer (RWM) 17 which functions when the reactor power is below a set value whereby withdrawal of control rods is inhibited when reactivity worth of those control rods exceeds a predetermined range so that the reactivity worth of the withdrawn control rod is held within the predetermined range, a gang control-rod select circuit 18 for selecting the control rod group number in the selected sequence and then selecting the ganged control rods to be operated at the same time, and a control rod insert/withdraw select circuit 19 for selecting insertion or withdrawal of the selected control rods.

The control panel 12 comprises a sequence select switch 12a actuatable by an operator for selecting any one of the A type sequence, the B type sequence and the control rod pattern exchange sequence, a control rod group select switch 12b actuatable by the operator for designating the group number to select a plurality of control rods to be operated at the same time, and a control rod insert/withdraw select switch 12c actuatable by the operator for selecting as to whether the selected control group is to be inserted or withdrawn.

In the central processing unit 13, the sequence select circuit 15 selects, in response to a command from the sequence select switch 12a, corresponding one of the aforesaid three sequences stored in the storage 14. The AND circuit 16 receives a signal from the power detector 5 to inhibit the selection of the control rod pattern exchange sequence when the reactor power is below the set value, and to permit the selection of the control rod pattern exchange sequence when the reactor power is above the set value. The rod worth minimizer 17 receives signals from the power detector 5 and the control rod position sensors 6 to output the sequence selected by the circuit 15 to the gang control-rod select circuit 18 when the reactor power is above the set value, and to determine whether the control rod group number selected by the operator via the control rod group select switch 12b is in match with the sequence selected by the sequence select circuit 15 when the reactor power is below the set value, followed by outputting the sequence selected by the circuit 15 to the gang control-rod select circuit 18 only when the selected group number is as per the sequence. The gang control-rod select circuit 18 receives the control rod group number selected by the operator and, in accordance with the sequence selected by the sequence select circuit 15, selects position data of plural control rods to be operated at the same time, followed by outputting the selected position data to the insert/withdraw select circuit 19. The insert/withdraw select circuit 19 selects, in accordance with the selection 7 by the operator via the insert/withdraw select switch 12c, either insertion or withdrawal of the plural control rods to be operated at the same time, followed by outputting a command signal to insert or withdraw the plural control rods corresponding to the position data selected by the gang control-rod select circuit 18 to the control rod drive controller 11.

The set value of the reactor power at which the rod worth minimizer 17 is to be released is usually set to 10% -35% of the rated power. The set value used for the AND circuit 16 is the same as the set value used for the rod worth minimizer 17.

Figure 3:
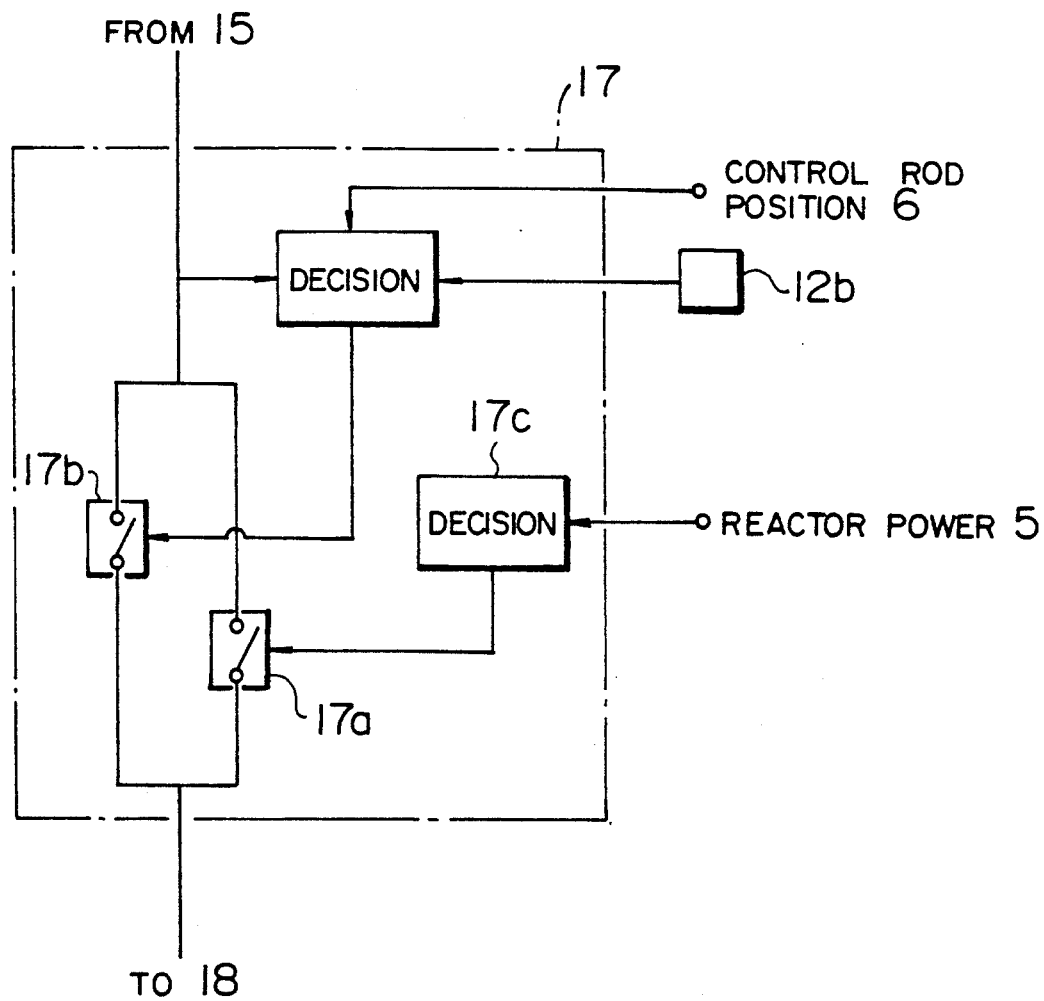
FIG. 3 is a functional block diagram of a rod worth minimizer shown in FIG. 2.

FIG. 3 shows details of the rod worth minimizer 17. The rod worth minimizer 17 comprises two switch functions 17a, 17b arranged parallel to each other and two decision functions 17c, 17d for respectively operating the switch functions 17a, 17d. The decision function 17c determines whether the reactor power is below the set value or not in accordance with the signal from the power detector 5, to open a switch of the function 17a when the reactor power is below the set value, and to close the switch of the function 17a when the reactor power is above the set value. The decision function 17d grasps the current withdrawal state of all the control rods in accordance with the signals from the control rod position sensors 6, and knows the correct number of the control rod group to be next withdrawn based on both the current withdrawal state of all the control rods and the sequence selected by the sequence select circuit 15, followed by closing a switch of the function 17b when the control rod group number selected by the control rod group select switch 12b is the same as the aforesaid correct group number, and opening the switch of the function 17b when the control rod group number selected by the control rod group select switch 12b is different from the aforesaid correct group number. Accordingly, under a condition that the reactor power is above the set value, since the switch of the function 17a is closed, the sequence selected by the sequence select circuit 15 is always outputted to the gang control-rod select circuit 18. Under a condition that the reactor power is below the set value, when the control rod group number selected by the operator via the control rod group select switch 12b is not in match with the correct group number of the sequence selected by the sequence select circuit 15, both the switches of the functions 17a, 17b are opened to prevent the selected sequence from being outputted to the gang control-rod select circuit 18, and when the selected control rod group number is in match with the correct group number, the switch of the function 17b is closed to output the selected sequence to the gang control-rod select circuit 18.

The A type sequence, the B type sequence and the control rod pattern exchange sequence which are stored, as an operation sequence of the ganged control rods to be operated at the same time, in the storage 14 of the central processing unit 13 will be next described below.

The control rods in the core are generally divided or classified into two groups A and B so that every adjacent control rods (herein those control rods arranged in diagonal relation are defined as not adjacent to each other) will not be included in the same group. The A group comprises those control rods arranged in the form of a checker board including a control rod positioned at the core center (see FIGS. 5(b) and FIG. 6(a)). The B group comprises those control rods other than ones in the A group, i.e., control rods arranged in the form of a checker board in which the control rod positioned at the core center is not included (see FIGS. 5(a) and FIG. 6(b)).

Figure 4A:
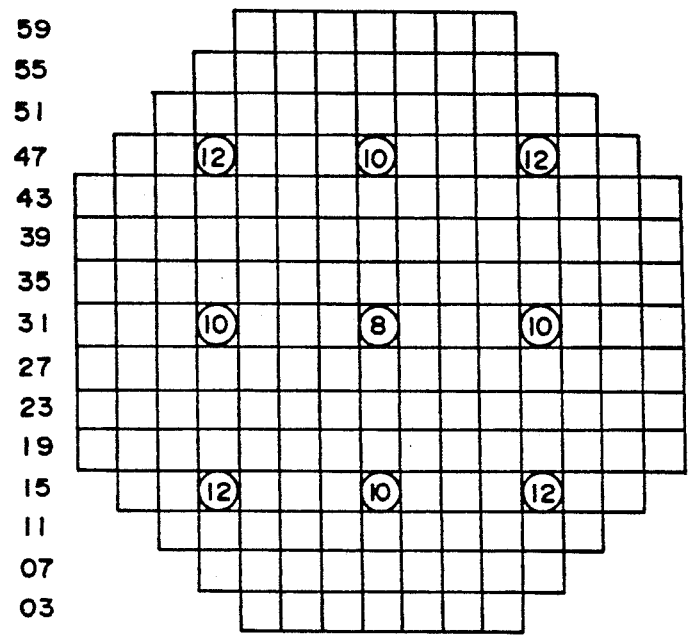
FIGS. 4(a) and 4(b) are diagrams showing examples of a control rod pattern.
Figure 4B:
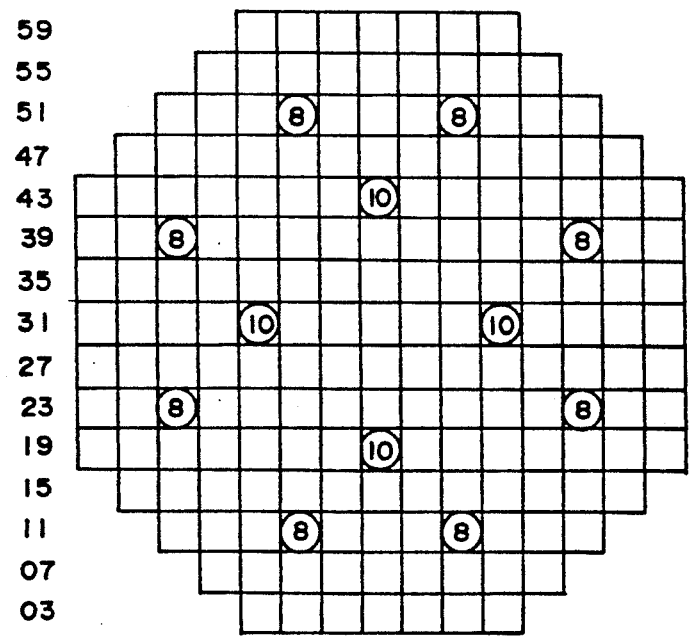

On the premise of the above grouping (classification) of control rods, the control rod pattern in a state of the objective rated power is divided into an A type control rod pattern and a B type control rod pattern. The A type control rod pattern is of, as shown in FIG. 4(a), a pattern in which the control rods which are inserted (or not fully withdrawn) in the state of the rated power all belong to the A group, i.e., a pattern of only those control rods arranged in the form of a checker board including the control rod at the core center. The B type control rod pattern is of, as shown in FIG. 4(b), a pattern in which the control rods which are inserted (or not fully withdrawn) in the state of the rated power all belong to the B group, i.e., a pattern of only those control rods arranged in the form of a checker board in which the control rod at the core center is not included. It will be noted that each box in FIG. 4 indicates one control rod and contains four fuel assemblies associated with that one control rod. The encircled numeral in the box stands for an amount of withdrawal of the control rod. Practically, the numeral 48 represents full withdrawal of the control rod and the numeral 0 represents no withdrawal, i.e., full insertion, of the control rod. Taking an example, the numeral 8 means that the control is withdrawn at a proportion of 8/48. Incidentally, the blank means 48, i.e., full withdrawal of the control rod.

The A type sequence is to configure the A type control rod pattern at the start-up of reactors and other occasions, while the B type sequence is to configure the B type control rod pattern. Each of both the sequences is set to divide the control rods into finer groups than the A or B group so that the before-mentioned RWM rules may be followed to hold the reactivity worth of any withdrawn control rod below a certain reference value.

More specifically, the A type sequence is set such that the B-group control rods are divided into four groups, i.e., groups 1 to 4, in such a manner that the control rods of the respective groups are evened in number and arrangement in order to follow the rules of the rod worth minimizer (RWM) 17 so that the reactivity worth of any withdrawn control rod may be held below a certain reference value, and the A-group control rods are divided into 18 groups, i.e., groups 5 to 22, each comprising one, four, eight or twelve control rods, in consideration of symmetry.

FIG. 5 shows one example of the A type sequence. In FIG. 5, each box indicates one control rod and the numeral in each box represents the control rod group number as with FIG. 4. All the control rods belonging to the same control rod group number are always operated to position at the same axial level in a ganged manner. The control rod groups 1 to 4 each comprise, as shown in FIG. 5(a), a part of the control rods (the B-group control rods: about half the number of total control rods) which are arranged in the form of a checker board in which the control rod at the core center is not included, and the control rod groups 5 to 22 each comprise, as shown in FIG. 5(b), a part of the control rods (the A-group control rods: about half the number of total control rods) which are arranged in the form of a checker board including the control rod at the core center. The number of control rods for each of the groups 1 to 4 is about ⅛ of the total number of control rods and the control rods in each of the groups 1 to 4 are evenly arranged across the core. The reason is to cut down a time necessary for operating the control rods and hence a start-up time, as well as to follow the rules of the RWM 17 as stated above.

Also, the B type sequence is set such that the A-group control rods are divided into four groups, i.e., groups 1 to 4, in such a manner that the control rods of the respective groups are evened in number and arrangement in order to follow the rules of the RWM 17 so that the reactivity worth of any withdrawn control rod may be held below the certain reference value, and the B-group control rods are divided into 18 groups, i.e., groups 5 to 22, each comprising two, four, eight or twelve control rods, in consideration of symmetry.

FIG. 6 shows one example of the B type sequence. In FIG. 6, each box indicates one control rod and the numeral in each box represents the control rod group number as with FIG. 4. All the control rods belonging to the same control rod group number are always operated to position at the same axial level in a ganged manner. The control rod groups 1 to 4 each comprise, as shown in FIG. 6(a), a part of the control rods (the A-group control rods: about half the number of total control rods) which are arranged in the form of a checker board including the control rod at the core center, and the control rod groups 5 to 22 each comprise, as shown in FIG. 6(b), a part of the control rods (the B-group control rods: about half the number of total control rods) which are arranged in the form of a checker board in which the control rod at the core center is not included. The number of control rods for each of the groups 1 to 4 is about ⅛ of the total number of control rods and the control rods in each of the groups 1 to 4 are evenly arranged across the core for the same reason as that in the case of the A type sequence.

The control rod pattern exchange sequence is a sequence for exchanging the control rod pattern between the A type control rod pattern and the B type control rod pattern in the state of the rated power, and it comprise a combination of the control rod group 5 to 22 for the A type sequence and the control rod group 5 to 22 for the B type sequence.

FIG. 7 shows one example of the control rod pattern exchange sequence. In FIG. 7, each box indicates one control rod and the numeral in each box represents the control rod group number as with FIG. 4. All the control rods belonging to the same control rod group number are always operated to position at the same axial level in a ganged manner. The control rod groups 1 to 18 shown in FIG. 7(a) corresponds to the control rod group 5 to 22 for the A type sequence shown in FIG. 5(b), and the control rod groups 19 to 36 shown in FIG. 7(b) corresponds to the control rod group 5 to 22 for the B type sequence. Accordingly, the number of control rod in each of the control rod groups ranges from 1 to 12.

The contents of practical data of the aforesaid three sequences stored in the storage 14 of the central processing unit 13, as well as the foregoing respective functions of the sequence select circuit 15, the rod worth minimizer 17, the gang control-rod select circuit 18 and the insert/withdraw select circuit 19 will be next described below in relation to the practical data.

In the storage 14 of the central processing unit 13, there are stored the A type sequence, the B type sequence and the control rod pattern exchange sequence as shown in FIGS. 8 to 10. In FIGS. 8 to 10, numerals in the left column each indicate the control rod group number and data in the right column are control rod coordinate values indicating radial positions of the control rods. Here, the radial position of each control rod in the core is defined by X - Y coordinate values. More specifically, in FIGS. 4 to 7, numerals arranged in the horizontal direction under the core are X coordinate values and numerals arranged in the vertical direction on the left side of the core are Y coordinate values. For example, the radial position of the control rod located at the bottom of FIG. 5(a) and belonging to the group 4 is expressed by coordinate values (30, 03). Using such a method of describing the position coordinate values, the storage 14 stores the control rod group numbers and the control rod coordinate values in correspondence to each other, such as the group number 1 of the A type sequence and the coordinate values (26, 55), (42, 55), (18, 47), (34, 47)..., for example.

When the A type sequence is selected by the sequence select switch 12a, for example, the sequence select circuit 15 takes in the A type sequence which comprises the group numbers from the control rod group 1 to 22 and the control rod coordinate data corresponding to the respective group numbers as shown in FIG. 8. The rod worth minimizer 17 recognizes the correct control rod group number to be next operated based on both the A type sequence and the current control rod positions detected by the position sensors 6, and then determines whether the group number selected by the control rod group select switch 12b is in match with the correct group number, as explained before. When the group number selected by the control rod group select switch 12b is in match with the correct group number, or when the reactor power is above the set value of the rod worth minimizer 17, the gang control-rod select switch 18 takes in the data that have been taken in by the sequence select switch 15, and then extracts the coordinate value data corresponding to the group number as selected by the control rod group select switch 12b, followed by outputting the extracted data to the insert/withdraw select circuit 19. In accordance with the selection made via the insert/withdraw select switch 12c, the insert/withdraw select circuit 19 outputs a command signal to insert or withdraw the plurality of control rods associated with the coordinate value data selected by the gang control-rod select circuit 18 to the control rod drive controller 11.

Operation of the control rod controlling system as previously constructed will be next described below.

First, operation at the start-up of a reactor will be explained in connection with the case where the control rods are withdrawn to increase the reactor power and attain the A type control rod pattern as shown in FIG. 4(a). To begin with, the operator actuates the sequence select switch 12a and selects the A type sequence shown in FIG. 5. Upon receiving such a command from the sequence select switch 12a, the sequence select circuit 15 selects the A type sequence data shown in FIG. 8. Then, the operator actuates the control rod group select switch 12b and first selects "1" as the group number of control rods to be operated at the same time. Upon receiving such a command from the control rod group select switch 12b, the gang control-rod select circuit 18 selects the coordinate values, shown in FIG. 8, corresponding to the control rod group number 1 out of the A type sequence data. After that, the operator actuates the insert/withdraw select switch 12c and selects withdrawal of the control rods to be operated at the same time. Upon receiving such a command from the insert/withdraw select switch 12c, the insert/withdraw select circuit 19 selects withdrawal of the control rods belonging to the group 1 and shown in FIGS. 5(a) and 8. The control rods belonging to the group 1 and shown in FIGS. 5(a) and 8 are thereby fully withdrawn in a ganged manner. Subsequently, the above steps using the control rod group select switch 12b and the insert/withdraw select switch 12c are repeated for each of the control rod groups 2 to 4, to thereby fully withdraw the control rods in each of the groups 2 to 4 shown in FIG. 5(a) in a ganged manner. As a result, the control rods about half of total ones in the core are withdrawn in the form of a checker board while following the rules of the RWM 17.

Here, the number of control rods for each of the groups 1 to 4 is about ⅛ of the total number of control rods in the core. By setting the number of ganged control rods in the groups 1 to 4 so large, the start-up time can be cut down.

In the above process of withdrawing the control rods of the groups 1 to 4, when the reactor power is below the set value of the rod worth minimizer 17, i.e., 10 % -35 % of the rated power, the rod worth minimizer 17 functions such that even if the operator should select the incorrect control rod group number by mistake, withdrawal of the control rod belonging to that group is inhibited to hold the reactivity worth of any withdrawn control rod within a predetermined range.

Then, the control rods of the groups 5 to 22 shown in FIG. 5(b) are withdrawn in a ganged manner by the operator actuating the control rod group select switch 12b and the insert/withdraw select switch 12c similarly to the above case. Consequently, the A type control rod pattern shown in FIG. 4(a) is obtained as a final objective pattern. In this withdrawing step, whichever control rods in the groups 5 to 22 are selected, the reactivity worth of any withdrawn control rod is held small because all the control rods adjacent thereto have already been withdrawn.

Also, in order to configure the B type control rod pattern as shown in FIG. 4(b), the operator actuates the sequence select switch 12a and selects the B type sequence shown in FIG. 6. Upon receiving such a command from the sequence select switch 12a, the sequence select circuit 15 selects the B type sequence data shown in FIG. 9. After that, the control rods are withdrawn group by group in a ganged manner with the similar steps to those in the above case of selecting the A type sequence.

Operation of exchanging the control rod pattern in the state of the rated power will be next described below by referring to FIG. 11. In FIG. 11, of the control rod pattern exchange sequence shown in FIG. 7, those control rod which are used to exchange the control rod pattern between the A type pattern of FIG. 4(a) and the B type pattern of FIG. 4(b) are indicated by fat lines surrounding the boxes.

Reactors usually keep on operating for approximately one year, but the control rod pattern is required to be exchanged several times during the continued operation. Let it now be supposed that the control rod pattern is exchanged from the A type pattern of FIG. 4(a) to the B type pattern of FIG. 4(b). Such exchange of the control rod pattern is carried out by first inserting the control rod used in the B type pattern to lower a power level, and then withdrawing the control rods used in the A type pattern to raise the power level.

With this embodiment, the above exchange of the control rod pattern is performed as follows. First, the operator actuates the sequence select switch 12a and selects the control rod pattern exchange sequence shown in FIG. 7. Upon receiving such a command from the sequence select switch 12a, the sequence select circuit 15 selects the control rod pattern exchange sequence data shown in FIG. 10. At this time, should the operation of selecting the control rod pattern exchange sequence is made when the reactor power is below the release power level (i.e., the set value) of the RWM 17, this selection would not be allowed under the function of the AND circuit 16. It is thus possible to avoid such a risk that adjacent control rods may be withdrawn in succession below the release power level of the RWM 17, which risk would otherwise occur upon selecting the control rod pattern exchange sequence, and also to follow the rules of the RWM 17.

Then, the operator actuates the control rod group select switch 12b and the insert/withdraw select switch 12c to select the group number of control rods to be operated at the same time and insertion or withdrawal of those control rod, whereupon the gang control-rod select circuit 18 and the insert/withdraw select circuit 19 are operated to carry out the control pattern exchange from the A type pattern to the B type pattern. This pattern exchange from the A type pattern to the B type pattern corresponds, in FIG. 11, to steps of inserting the control rods of the group 32 from the fully withdrawn state to a position of 10 notches and the control rods of the group 34 from the fully withdrawn state to a position of 8 notches, and steps of fully withdrawing the inserted control rods of the group 18 (at 8 notches), the group 15 (at 10 notches) and the group 13 (at 12 notches). In this connection, since the control rods are operated above the release power level of the RWM 17, this operation of the control rod would not be inhibited by the RWM 17 even if the control rods of the groups 32 and 34 are all inserted at a time and the control rods of the groups 13, 15 and 18 are all withdrawn at a time. However, if insertion and withdrawal of the control rods are each carried out at a time a mentioned above, the reactor power would be too low and, for this reason, the following procedure is usually adopted. Specifically, the control rods are inserted and withdrawn in several steps such as inserting a part of the control rods to be inserted, withdrawing a part of the control rods to be withdrawn, inserting another part of the control rods to be inserted, withdrawing another part of the control rods to be withdrawn, and so on, in order that the reactor power will not be too low. For example, the control rods of the group 32 are inserted from 48 notches (i.e., the fully withdrawn state) to 24 notches, the control rods of the group 18 are withdrawn from 10 notches to 20 notches, the control rods of the group 32 are inserted again to 12 notches, the control rods of the group 15 are withdrawn from 10 notches to 18 notches, and so on. Such repeated operations can be easily implemented in this embodiment because the control rod pattern exchange sequence shown in FIG. 10 is stored beforehand.

Figure 12A:
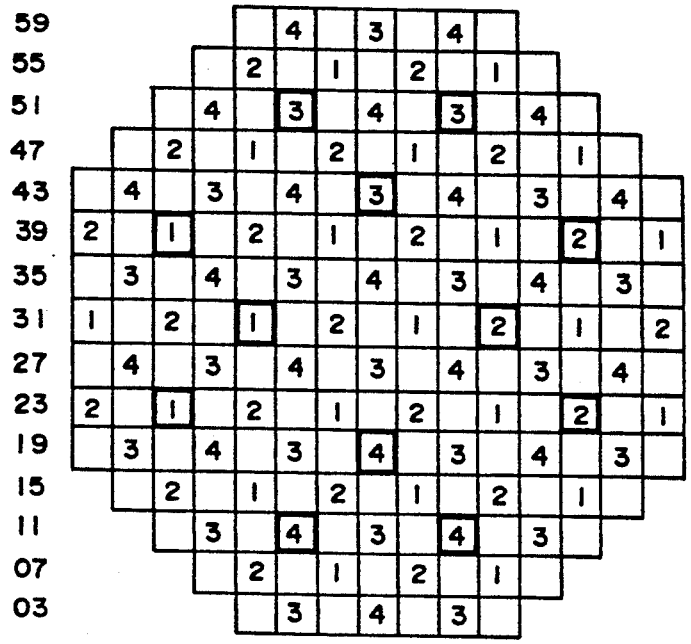
FIGS. 12(a) and 12(b) are diagrams showing an example of the A type sequence shown in FIG. 5 corresponding to FIGS. 4(a) and 4(b).
Figure 12B:
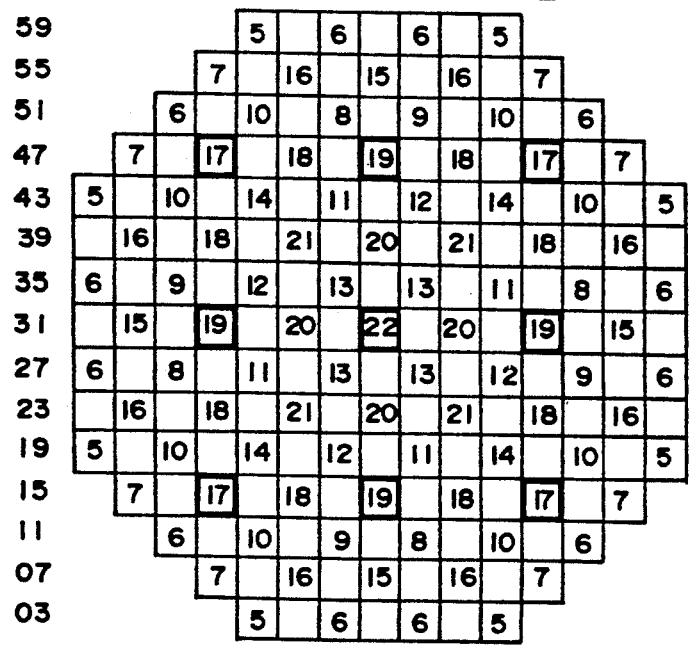
Figure 13A:
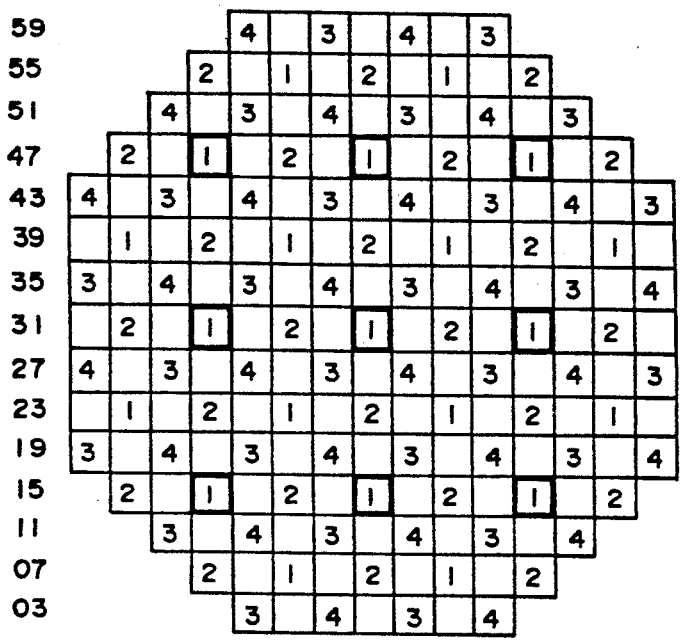
FIGS. 13(a) and 13(b) are diagrams showing an example of the B type sequence shown in FIG. 6 corresponding to FIGS. 4(a) and 4(b).
Figure 13B:
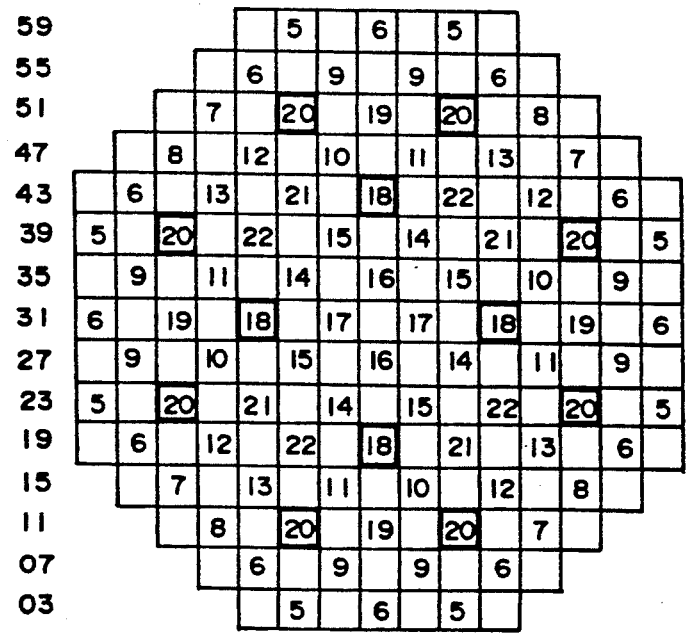

The reason why the operation of exchanging the control rod pattern is facilitated in this embodiment will be next described below with reference to FIGS. 12 and 13. In FIG. 12, those control rods in the A type sequence of FIG. 5 which are utilized in the A type pattern and the B type pattern of FIG. 4 are indicated by fat lines surrounding the corresponding boxes. In FIG. 13, those control rods in the B type sequence of FIG. 6 which are utilized in the A type pattern and the B type pattern of FIG. 4 are indicated by fat lines surrounding the corresponding boxes.

In existing boiling water reactors, with the control rods operated one by one, there are used two sequence data, i.e., the A type sequence (FIG. 5) and the B type sequence (FIG. 6), to follow the RWM rules at the start-up of the reactors. Usually, only one of the A type sequence and the B type sequence is stored in the storage of the central processing unit. Thus, the A type sequence is stored in the storage when the A type control rod pattern is to be configured, and the B type sequence is stored in the storage instead of the A type sequence when the B type control rod pattern is to be configured. Additionally, in the exchange of the control rod pattern, no sequence is required and the control rods are inserted or withdrawn one by one because the reactor power is above the set level at which the RWM is to be released.

On the other hand, in the case of adopting the gang operation, there would occur the following problem in exchanging the control rod pattern if only the A type sequence and the B type sequence are used as exchange sequences.

Let it now be assumed, for example, that the control rods of the group 32 shown in FIG. 11(b) are inserted from 48 notches to 24 notches in the exchange from the A type control rod pattern shown in FIG. 4(a) to the B type control rod pattern shown n FIG. 4(b) as with the above case. Since the group in match with the control rod group 32 shown in FIG. 11(b) is not present in the A type sequence of FIG. 12, the B type sequence of FIG. 13 is first selected and the control rod group 18 is then selected from the B type sequence of FIG. 13, followed by pushing the insert switch to insert the control rods of the group 18 until 24 notches. Here, if the A type sequence were selected, even those control rods which must be kept fully withdrawn would be inserted through the gang operation, as will be seen from FIG. 12(a), whichever one of the control rod groups 1 to 4 is selected. Next, let consider the operation of withdrawing the control rod group 18 shown in FIG. 11(a) from 10 notches to 20 notches. In this case, it will be found from FIG. 13(a) that the control rod group 18 shown in FIG. 11 belongs to the control rod group 1 in the B type sequence, but this group 1 includes other control rods which must be kept fully withdrawn. Accordingly, the operation is carried out by first selecting the A type sequence, selecting the control rod group 22 shown in FIG. 12(b), and then pushing the withdraw switch to withdraw it until 20 notches. Subsequently, the B type sequence is selected again. In this way, the A type sequence and the B type sequence are required to be alternately selected for each gang operation of the control rods.

As explained above, when operating the control rods in a ganged manner, if only the A type sequence and the B type sequence are used as exchange sequences, selection of the sequence (A type or B type) which has not been needed in the existing scheme of operating the control rods one by one is required to be always made before starting the control rod operation.

In the above process, the A type sequence is practically selected by storing the A type sequence in the storage of the central processing unit, and the B type sequence is also selected by storing the B type sequence in the storage. This means that each time the other sequence is selected, the sequence currently stored in the storage requires to be changed, resulting in the very complicated operation.

On the other hand, control rods are quite important as means for controlling reactivity of reactors and required to have high reliability in operation. This necessitates that in the gang control-rod operation to operate a plurality of control rods at the same time, only those control rods which are designated as belonging to the same group are surely operated at the same time. In the gang controlrod operation to operate a plurality of control rods at the same time, therefore, whenever the stored sequence is changed, it is indispensable to confirm whether the newly stored sequence is correct, or whether any error has occurred. Alternate selection of the A type sequence and the B type sequence entails confirmation of the newly stored sequence whenever it is stored, which makes the operation more complicated and deteriorates the reliability.

To the contrary, in this embodiment, the A type sequence (FIG. 5) and the B type sequence (FIG. 6) are utilized to follow the rules of the RWM system when the reactor power is low at the start-up of the reactor. In exchanging the control rod pattern, the control rod pattern exchange sequence (FIG. 6) is newly added in view of the fact that the reactor power is above a set level at which the rules of the RWM system is to be released. By first selecting the control rod pattern exchange sequence as an exchange sequence, further selection of the sequence is no longer required. This is because the control rod pattern exchange sequence includes all the control rod groups which are needed in the exchange operation of the control rod pattern, i.e., all the groups subsequent to the control rod group 5 in both the A type sequence and the B type sequence. Since these A type and B type sequences are previously stored in the storage 14 of the central processing unit 13, selection of the control rod pattern exchange sequence only requires the operator to actuate the sequence select switch 12a and select it. As a result, the operation of exchanging the control rod pattern is facilitated and high reliability is ensured in the gang control-rod operation.

According to the present invention, as has been described above, since an operation sequence for the control rod pattern exchange is stored in advance in a gang control-rod controlling system for operating a plurality of control rods at the same time, it is possible to very easily carry out the operation of exchanging the control rod pattern and also to achieve high reliability while adopting the gang control-rod operation.

In addition, should the operation of selecting the control rod pattern exchange sequence is made when the reactor power is below a set level at which the RWM is to be released, that selection would not be allowed, making it possible to avoid such a risk that adjacent control rods may be withdrawn in succession below the release power level of the RWM, and thus to ensure a high degree of safety.

What is claimed is:

1. A gang control-rod controlling system for operating a plurality of control rods at the same time to attain a predetermined control rod pattern, wherein said sytem comprises:

(a) first means storing a first sequence of control rod operations for operating a plurality of control rods at the same time to configure a first control rod pattern, a second sequence of control rod operations for operating a plurality of control rods at the same time to configure a second control rod pattern, and a third sequence of control rod operations for operating a plurality of control rods at the same time to exchange a control rod pattern between said first control rod pattern and said second control rod pattern; and (b) second means for selecting one of said first to third sequences of control rod operations stored in said first means, and operating a plurality of control rods at the same time based on the selected sequence of control rod operations.

2. A gang control-rod controlling system according to claim 1, wherein said second means includes means for inhibiting selection of said third sequence of control rod operations when reactor power is below a set value.

3. A gang control-rod controlling system according to claim 1, wherein said second means includes rod worth limiting means that functions when reactor power is below a set value whereby withdrawal of control rods is inhibited when reactivity worth of those control rods exceeds a predetermined range.

4. A gang control-rod controlling system according to claim 3, wherein said second means further includes means actuatable by an operator for selecting the group number of plural control rods to be operated at the same time, and when said reactor power is below the set value, said rod worth limiting means determines whether or not said control rod group number selected by the operator is in match with said selected sequence of control rod operations and, if the decision is no, inhibits output of said selected sequence of control rod operations.

5. A gang control-rod controlling system according to claim 1, wherein said second means includes first operating means actuatable by an operator for selecting one of said first to third sequences of control rod operations, second operating means actuatable by the operator for selecting the group number of plural control rods to be operated at the same time, third operating means actuatable by the operator for selecting insertion or withdrawal of plural control rods to be operated at the same time, sequence select means for selecting one of said first to third sequences of control rod operations stored in said first means that corresponds to the sequence of control rod operations selected by said first operating means, gang, control-rod select means for selecting position data, associated with control rods of the group number selected by said second operating means, from the sequence of control rod operations selected by said sequence select means, and control rod operation select means for determining, based on the selection by said third operating means, insertion or withdrawal of the plural control rods associated with the position data selected by said gang controlrod select means.

6. A gang control-rod controlling system according to claim 5, wherein said second means further includes means for, when said reactor power is below the set value, determining whether or not the control rod group number selected by said second operating means is in match with the sequence of control rod operations selected by said sequence select means and, if the decision is no, disabling said selected sequence of control rod operations.

7. A gang control-rod controlling system according to claim 1, wherein said first sequence of control rod operations includes first sequence data to configure a first type control rod pattern in which control rods inserted at a rated power comprise only those control rods arranged in the form of a checker board including a control rod at the core center, said second sequence of control rod operations includes second sequence data to configure a second type control rod pattern in which control rods inserted at the rated power comprise only those control rods arranged in the form of a checker board in which a control rod at the core center is not included, and said third sequence of control rod operations includes third sequence data in combination of a part of said first sequence data and a part of said second sequence data.

8. A gang control-rod controlling system according to claim 1, wherein each of said first to third sequences of control rod operations includes data comprising the group numbers of plural control rods to be operated at the same time in correspondence to coordinate values indicative of respective radial positions of the control rods belonging to each group number.

9. A gang control-rod controlling system according to claim 1, wherein said first sequence of control rod operations contains sequence data in which all control rods are divided into first to m-th groups in order of withdrawing the control rods, in the first to fourth groups including those control rods of about half the number of total control rods that are arranged in the form of a checker board and in which a control rod at the core center is not included, and the fifth to m-th groups including the remaining about half control rods; said second sequence of control rod operations contains sequence data in which all control rods are divided into first to n-th groups in order of withdrawing the control rods, the first to fourth groups including those control rods of about half the number of total control rods that are arranged in the form of a checker board including the control rod at the core center, and the fifth to n-th groups including the remaining about half control rods; and said third sequence of control rod operations contains sequence data in combination of the fifth to m-th groups in said first sequence of control rod operations and the fifth to n-th groups in said second sequence of control rod operations.

10. A reactor operation method for operating a plurality of control rods at the same time to attain a predetermined control rod pattern, wherein said method comprises:

(a) a first step of previously storing a first sequence of control rod operations for operating a plurality of control rods at the same time to configure a first control rod pattern, a second sequence of control rod operations for operating a plurality of control rods at the same time to configure a second control rod pattern, and a third sequence of control rod operations for operating a plurality of control rods at the same time to exchange a control rod pattern between said first control rod pattern and said second control rod pattern; and (b) a second step of selecting one of said first to third sequences of control rod operations stored in said first step, and operating a plurality of control rods at the same time based on the selected sequence of control rod operations.

11. A reactor operation method according to claim 10, wherein said second step selects one of said second and third sequences of control rod operations when reactor power is below a set value, and selects one of said first, second and third sequences of control rod operations when said reactor power is above the set value.

12. A reactor operation method according to claim 10, wherein said second step selects the group number of plural control rods to be operated at the same time in response to actuation by an operator, outputs said selected sequence of control rod operations only when said control rod group number selected by the operator is in match with said selected sequence of control rod operations when said reactor power is below the set value, and always outputs said selected sequence of control rod operations when said reactor power is above the set value.

* * * * *